(12) United States Patent
Tendler et al.

(10) Patent No.: US 12,105,764 B2
(45) Date of Patent: Oct. 1, 2024

(54) EMPTY SEARCH STATE

(71) Applicant: Dropbox, Inc., San Francisco, CA (US)

(72) Inventors: Tal Tendler, Raanana (IL); Morgan Zerby, Kirkland, WA (US); Sigalit Sadeh, Tel Aviv (IL); Rottem Shaul Shiloni, Ramat Gan (IL)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/809,681

(22) Filed: Jun. 29, 2022

(65) Prior Publication Data

US 2024/0004940 A1  Jan. 4, 2024

(51) Int. Cl.
*G06F 16/9532* (2019.01)
*G06F 16/951* (2019.01)

(52) U.S. Cl.
CPC ........ *G06F 16/9532* (2019.01); *G06F 16/951* (2019.01)

(58) Field of Classification Search
CPC ............................ G06F 16/9532; G06F 16/951
See application file for complete search history.

(56) References Cited

U.S. PATENT DOCUMENTS

| | | | | |
|---|---|---|---|---|
| 7,603,349 B1 * | 10/2009 | Kraft | ................. | G06F 16/24575 707/999.005 |
| 7,856,441 B1 * | 12/2010 | Kraft | ..................... | G06F 16/951 707/758 |
| 7,958,143 B1 | 6/2011 | Amacker | | |
| 8,521,526 B1 * | 8/2013 | Lloyd | ................. | G06F 16/3344 704/251 |
| 8,577,913 B1 * | 11/2013 | Hansson | ............. | G06F 16/9535 707/767 |
| 2002/0087408 A1 * | 7/2002 | Burnett | ................... | G06Q 30/02 |
| 2007/0282811 A1 * | 12/2007 | Musgrove | ........... | G06F 16/2423 |
| 2008/0016040 A1 * | 1/2008 | Jones | ..................... | G06Q 30/02 |
| 2008/0077558 A1 * | 3/2008 | Lawrence | ............. | G06F 40/131 |
| 2008/0177994 A1 * | 7/2008 | Mayer | ..................... | G06F 16/00 709/224 |
| 2009/0198675 A1 * | 8/2009 | Mihalik | ................ | G06F 16/248 707/999.005 |
| 2010/0250578 A1 * | 9/2010 | Athsani | .............. | G06Q 30/0256 707/765 |
| 2011/0258049 A1 * | 10/2011 | Ramer | ............... | G06Q 30/0273 705/14.69 |
| 2012/0130969 A1 * | 5/2012 | Wong | .................. | G06F 16/9535 707/706 |
| 2012/0158765 A1 * | 6/2012 | Kumar | ................ | G06F 16/3325 707/766 |

(Continued)

*Primary Examiner* — Mark E Hershley
(74) *Attorney, Agent, or Firm* — Polsinelli PC

(57) ABSTRACT

The present technology provides an improved search interface that provides suggested search terms in a variety of categories. The suggested search terms are first presented in an "empty search state" i.e., before the user has entered any search terms. And the suggested search terms are repeatedly refined as the user provides inputs into the search interface until a number of search results are few enough that the interface provides search results. The present technology also provides improved search suggestions. In particular, the present technology utilizes predictive algorithms including machine learning algorithms to intelligently provide suggested search terms in the variety of categories.

16 Claims, 12 Drawing Sheets

(56) References Cited

U.S. PATENT DOCUMENTS

| | | | |
|---|---|---|---|
| 2012/0185360 A1* | 7/2012 | Ullman | G06Q 30/0625 |
| | | | 705/26.62 |
| 2012/0265779 A1* | 10/2012 | Hsu | G06F 16/3322 |
| | | | 707/E17.074 |
| 2014/0075004 A1* | 3/2014 | Van Dusen | G07C 13/00 |
| | | | 709/223 |
| 2014/0201126 A1* | 7/2014 | Zadeh | A61B 5/165 |
| | | | 706/52 |
| 2014/0229462 A1* | 8/2014 | Lo | G06F 16/24575 |
| | | | 707/707 |
| 2016/0132608 A1* | 5/2016 | Rathod | H04W 4/21 |
| | | | 707/722 |
| 2016/0179816 A1* | 6/2016 | Glover | G06F 16/24578 |
| | | | 707/767 |
| 2016/0188619 A1* | 6/2016 | Su | G06F 16/3322 |
| | | | 707/728 |
| 2016/0255139 A1* | 9/2016 | Rathod | H04N 1/32101 |
| | | | 709/203 |
| 2016/0360382 A1* | 12/2016 | Gross | H04W 4/40 |
| 2017/0212926 A1* | 7/2017 | Amacker | G06F 3/04817 |
| 2018/0268072 A1* | 9/2018 | Rathod | G06F 16/248 |
| 2020/0074001 A1* | 3/2020 | Lloyd | G06F 16/9535 |
| 2021/0118008 A1* | 4/2021 | Glover | G06Q 30/0247 |
| 2021/0312000 A1* | 10/2021 | Swaminathan | G06F 16/954 |
| 2022/0107802 A1* | 4/2022 | Rao | G06F 16/907 |
| 2022/0179665 A1* | 6/2022 | Rathod | G06F 9/451 |

* cited by examiner

```
┌─────────────────────────────────────────────────────────────────┐
│  UTILIZING A MACHINE LEARNING ALGORITHM OR HEURISTIC TO         │
│  ANALYZE OBJECTS IN A USER ACCOUNT TO PROVIDE SUGGESTED SEARCH  │
│                         TERMS 602                               │
└─────────────────────────────────────────────────────────────────┘
                                  │
                                  ▼
┌─────────────────────────────────────────────────────────────────┐
│           BUILDING AN INDEX OF SUGGESTED SEARCH TERMS 604       │
└─────────────────────────────────────────────────────────────────┘
```

FIG. 6

EMPTY SEARCH STATE

BACKGROUND

Search interfaces have always been a critical part of electronic architectures, and many advancements have been made in search engines and search interfaces. However, new data is created at ever faster rates leading to further increasing the burden on search technologies. The best information is only useful if it can be timely found.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 6 illustrates an example method for utilizing a machine learning algorithm or heuristic to provide suggested search terms in accordance with some aspects of the present technology.

DETAILED DESCRIPTION

Figure 1:
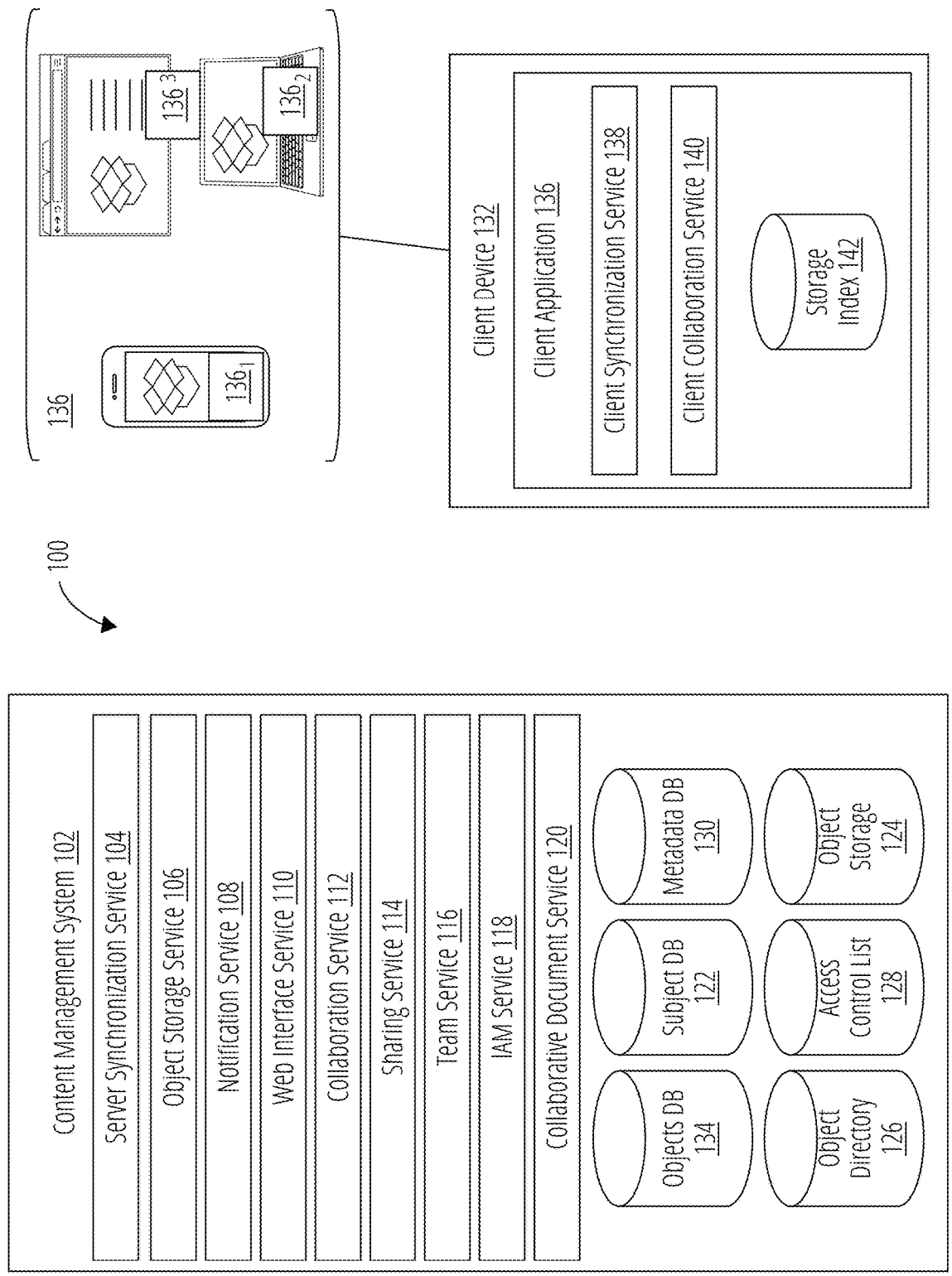
FIG. 1 illustrates an example of a content management system and client devices in accordance with some aspects of the present technology.

Search interfaces have always been a critical part of electronic architectures, and many advancements have been made in search engines and search interfaces. However, new data is created at ever faster rates, further increasing the burden on search technologies. The best information is only useful if it can be timely found.

The present technology provides an improved search interface to aid a user in initiating and refining a search. While many technologies have improved the functioning of search algorithms, they all rely on receiving a sufficient search input to surface a result that meets the user's needs.

In order to help users input effective search strings, some technologies can utilize faceted search or type-ahead technology. In a faceted search, a user can enter an initial search term, and the search interface can provide a menu of additional search terms that occur in results that also match the initial search term. In type-ahead technology, a search interface can suggest complete search terms after a user enters initial characters.

Although these technologies are useful, users still struggle to find data objects (hereinafter "objects") that are the target of their search. The present technology acknowledges that users may recall aspects of objects through various associations, and some of these associations do not involve traditional search terms. This is especially true in the case of user-created content where a user might recall aspects of an object other than its content. A user might recall a context in which an object was created, such as a project topic or people that collaborated on the object.

The present technology provides an improved search interface that provides suggested search terms in a variety of categories. The suggested search terms are first presented in an "empty search state," i.e., before the user has entered any search terms. And the suggested search terms are repeatedly refined as the user provides inputs into the search interface until the number of search results are few enough that the interface provides search results.

The present technology also provides improved search suggestions. In particular, the present technology utilizes predictive algorithms, including machine learning algorithms, to intelligently provide suggested search terms in a variety of categories.

The present technology is more efficient in directing a user to find objects. A clear visual representation of search options can enhance the user's search experience and reduce the time spent looking for content. For example, the present technology can immediately suggest search terms, before a search input is provided into the search field, that the user can select to narrow down a search. The suggested search terms can be of higher quality than a user might have conceived of on their own or might be in a different category than a user is accustomed to searching within. The suggested search results are provided before any input is provided into the search field and are continuously updated to aid in the construction of a search with search terms that can more directly lead a user to the desired search result. Accordingly, the suggested search terms can result in a reduced number of interactions to arrive at the desired search result.

In many cases, the present technology can suggest search terms that can take the user directly to the desired search result. The present technology can predict suggested search terms, where some predicted search terms can be potential search results or correspond to a single search result. When the user selects a search term that is also a search result or applies to a single search result, the object can be opened directly from the suggested search terms after the user selects the suggested search term. In this context, one way the present technology is more efficient is that it can directly open a search result from the search user interface.

In some embodiments the disclosed technology is deployed in the context of a content management system having object synchronization capabilities and collaboration features, among others. An example system 100 configuration is shown in FIG. 1, which depicts content management system 102 interacting with client application 136.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 122. Subject database 122 can identify a registered subject by a subject ID, and store profile information for registered subjects in association with the subject ID. In some cases, profile information for registered subjects includes a subject name and/or email address. Subject database 122 can include account management information, such as account type (e.g. various tiers of free or paid accounts), storage space allocated, storage space used, client applications 136 having a registered content management client application 136 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 122 need not store complete information associated with an account for a subject. Some portion of information associated with an account for a subject can also be stored in another database of content management system 102 such as metadata database 130, or in a database external to content management system 102.

Subject database 122 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 122 can be broken into a plurality of tables, indexes and other data structures.

Object Storage

A feature of content management system 102 is the storage of objects, which can be stored in object storage 124. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 124 is combined with other types of storage or databases to handle specific functions. Object storage 124 can store objects, while metadata regarding the objects can be stored in metadata database 130. Likewise, data regarding where an object is stored in object storage 124 can be stored in object directory 126. Additionally, data regarding changes, access, etc. can be stored in objects database 134. Objects database 134 can also include a subject account identifier that identifies the subject IDs that have access to the object.

In some embodiments, objects database 134 can be broken into a plurality of tables, indexes and other data structures.

Each of the various storages/databases such as object storage 124, object directory 126, objects database 134, and metadata database 130 can be comprised of more than one such storage or database and can be distributed over many devices and locations. Other configurations are also possible. For example, data from object storage 124, object directory 126, objects database 134, and/or metadata database 130 may be combined into one or more object storages or databases or further segmented into additional object storages or databases. Thus, content management system 102 may include more or less storages and/or databases than shown in FIG. 1.

In some embodiments, object storage 124 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 124. The location of each chunk making up an object can be recorded in object directory 126. Object directory 126 can include a content entry for each object stored in object storage 124. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 134. The content path can include the name of the object and/or folder hierarchy associated with the object. For example, the content path can include a folder or path of folders in which the object is stored in a local file system on a client device 132. In some embodiments, object database might only store a direct ancestor or direct child of any object, which allows a full path for an object to be derived, and can be more efficient than storing the whole path for an object.

While objects are stored in object storage 124 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 124.

While the directory structure in which an account views objects does not correlate to storage locations of the objects at content management system 102, the directory structure can correlate to storage locations of the objects on client application 136 depending on the file system used by client application 136.

As addressed above, a content entry in object directory 126 can also include the location of each chunk making up an object. More specifically, the content entry can include content pointers that identify the location in object storage 124 of the chunks that make up the object.

Object storage service 106 can decrease the amount of storage space required by identifying duplicate objects or duplicate blocks that make up an object or versions of an object. Instead of storing multiple copies, object storage 124 can store a single copy of the object or block of the object, and object directory 126 can include a pointer or other mechanism to link the duplicates to the single copy.

Object storage service 106 can also store metadata describing objects, object types, folders, file path, and/or the relationship of objects to various accounts, collections, or groups in metadata database 130, in association with the object ID of the object.

Object storage service 106 can also store a log of data regarding changes, access, etc. in objects database 134. Objects database 134 can include the object ID of the object and can optionally include a description of the change or access action along with a time stamp or version number and any other relevant data. Objects database 134 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 134.

Object Synchronization

Another feature of content management system 102 is synchronization of objects with at least one client application 136. Client device(s) 132 can take different forms and have different capabilities. For example, client application 136 can be a computing device having a local file system accessible by multiple applications resident thereon. Client application 136 can be a computing device wherein objects are only accessible to a specific application or by permission given by the specific application, and the objects are typically stored either in an application specific space or in the cloud. Client application 136 can be any client device accessing content management system 102 via a web browser and accessing objects via a web interface. While example client application 136 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client 136's capabilities. One or more functions described herein with respect to client application 136 may or may not be available on every client device depending on the specific capabilities of the device—the file access model being one such capability.

In many embodiments, client applications 136 are associated with an account of content management system 102, but in some embodiments client applications 136 can access content using shared links and do not require an account.

As noted above, some client devices 132 can access content management system 102 using a web browser. However, client devices can also access content management system 102 using client application 136 stored and running on client application 136. Client application 136 can include a client synchronization service 138.

Client synchronization service 138 can be in communication with server synchronization service 104 to synchronize changes to objects between client application 136 and content management system 102.

Client application 136 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client application 136.

Objects can be synchronized from client application 136 to content management system 102, and vice versa. In embodiments wherein synchronization is from client application 136 to content management system 102, a subject can manipulate objects directly from the file system of client application 136, while client synchronization service 138 can monitor directory on client application 136 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104, and learns the unique client identifier from the operating system of client application 136.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 134, metadata database 130, object directory 126, object storage 124, subject database 122, etc. as appropriate.

When synchronizing from content management system 102 to client application 136, data regarding a mount, modification, addition, deletion, move of an object recorded in objects database 134 can trigger a notification to be sent to client application 136 using notification service 108. When client application 136 is informed of the change, client application 136 can make a request for changes listed in objects database 134 since the last synchronization point known to the client application 136. When client application 136 determines that it is out of synchronization with content management system 102, client synchronization service 138 requests object blocks including the changes, and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client application 136 to content management system 102.

Sometimes client application 136 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client application 136 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102, but lacking the data of the complete object. The placeholder object can be a few bytes or less in size while the respective complete object might be significantly larger. After client application 136 attempts to access the object, client synchronization service 138 can retrieve the data of the object from content management system 102 and provide the complete object to client application 136. This approach can provide significant space and bandwidth savings while still providing full access to a subject's objects on content management system 102.

While the synchronization embodiments addressed above referred to client application 136 and a server of content management system 102, it should be appreciated by those of ordinary skill in the art that a user account can have any number of client applications 136 all synchronizing objects with content management system 102, such that changes to an object on any one client application 136 can propagate to other client applications 136 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client application 136. The sharing can be performed in a platform agnostic manner. That is, the content can be shared across multiple client applications 136 of varying type, capabilities, operating systems, etc. The content can also be shared across varying types of subject accounts.

To share an object within content management system 102 sharing service 114 can add associate a subject ID of a team or of one or more subject accounts with a content item in objects database 134 associated with the object, thus granting the added subject account(s) access to the object. Sharing service 114 can also remove subject IDs from being permitted to access a content item in objects database 134 to restrict a subject account's access to the object. Sharing service 114 can record object identifiers, subject identifiers given access to an object, and access levels in objects database 134. For example, in some embodiments, subject identifiers associated with a single content item can specify different permissions for respective subject identifiers with respect to the associated object.

In some embodiments, content management system 102 can include an access control list 128 which includes a description of complete access rights pertaining to a respective object. An access control list for any respective object in content management system can be derived from objects database 134. In some embodiments, it is not desirable to maintain a persistent access control list 128 for a respective object, as an access control list 128 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 134 that a URL to the object has been created. In some embodiments, an entry into objects database 134 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 134 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team, and can manage subject accounts that are associated with the team. Teams, sub-teams, subject accounts are all given a subject identifier in subject database 122, and the membership to teams by subject accounts is also recorded in subject database 122.

IAM (Identity and Access Management) Service

In some embodiments, content management system 102 includes IAM service 118. IAM service 118 can authenticate a subject account. For subject accounts with multiple levels of rights (e.g. a subject account with subject rights and administrator rights) IAM service 118 can also facilitate explicit privilege escalation to avoid unintentional actions by administrators.

Object Access

Object storage service 106 can receive a token from client application 136 that follows a request to access an object and can return the capabilities permitted to the subject account.

Presence and Seen State

In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client application 136 is accessing the object. Notifications service 108 can then notify all client devices of other subjects having access to the same object of the presence of the subject of client application 136 with respect to the object.

In some embodiments, content management system 102 can report a history of subject interaction with a shared object. Collaboration service 112 can query data sources such as metadata database 130 and objects database 134 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 130.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.

Collaboration Objects

In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 140 can provide a native application companion interface for the purpose of displaying information relevant to an object being presented on client application 136. In embodiments wherein an object is accessed by a native application stored and executed on client application 136, where the object is in a designated location of the file system of client application 136 such that the object is managed by client application 136, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 124 via an application programming interface (API) on behalf of a subject. For example, a software package such as an application running on client application 136, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 124 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client application 136 can connect to content management system 102 on behalf of a subject. A subject can directly interact with client application 136, for example when client application 136 is a desktop or laptop computer, phone, television, internet-of-things device, etc. Alternatively or additionally, client application 136 can act on behalf of the subject without the subject having physical access to client application 136, for example when client application 136 is a server.

Some features of client application 136 are enabled by an application installed on client application 136. In some embodiments, the application can include a content management system specific component. For example, the content management system specific component can be a stand-alone client application 136, one or more application plug-ins, and/or a browser extension. However, the subject can also interact with content management system 102 via a third-party application, such as a web browser, that resides on client application 136 and is configured to communicate with content management system 102. In various implementations, the client application 136 can present a subject interface (UI) for a subject to interact with content management system 102. For example, the subject can interact with the content management system 102 via a file system explorer integrated with the file system or via a webpage displayed using a web browser application.

In some embodiments, client application 136 can be configured to manage and synchronize content for more than one account of content management system 102. In such embodiments client application 136 can remain logged into multiple accounts and provide normal services for the multiple accounts. In some embodiments, each account can appear as folder in a file system, and all objects within that folder can be synchronized with content management system 102. In some embodiments, client application 136 can include a selector to choose one of the multiple accounts to be the primary account or default account.

Third Party Services

In some embodiments content management system 102 can include functionality to interface with one or more third party services such as workspace services, email services, task services, etc. In such embodiments, content management system 102 can be provided with login credentials for a subject account at the third party service to interact with the third party service to bring functionality or data from those third party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
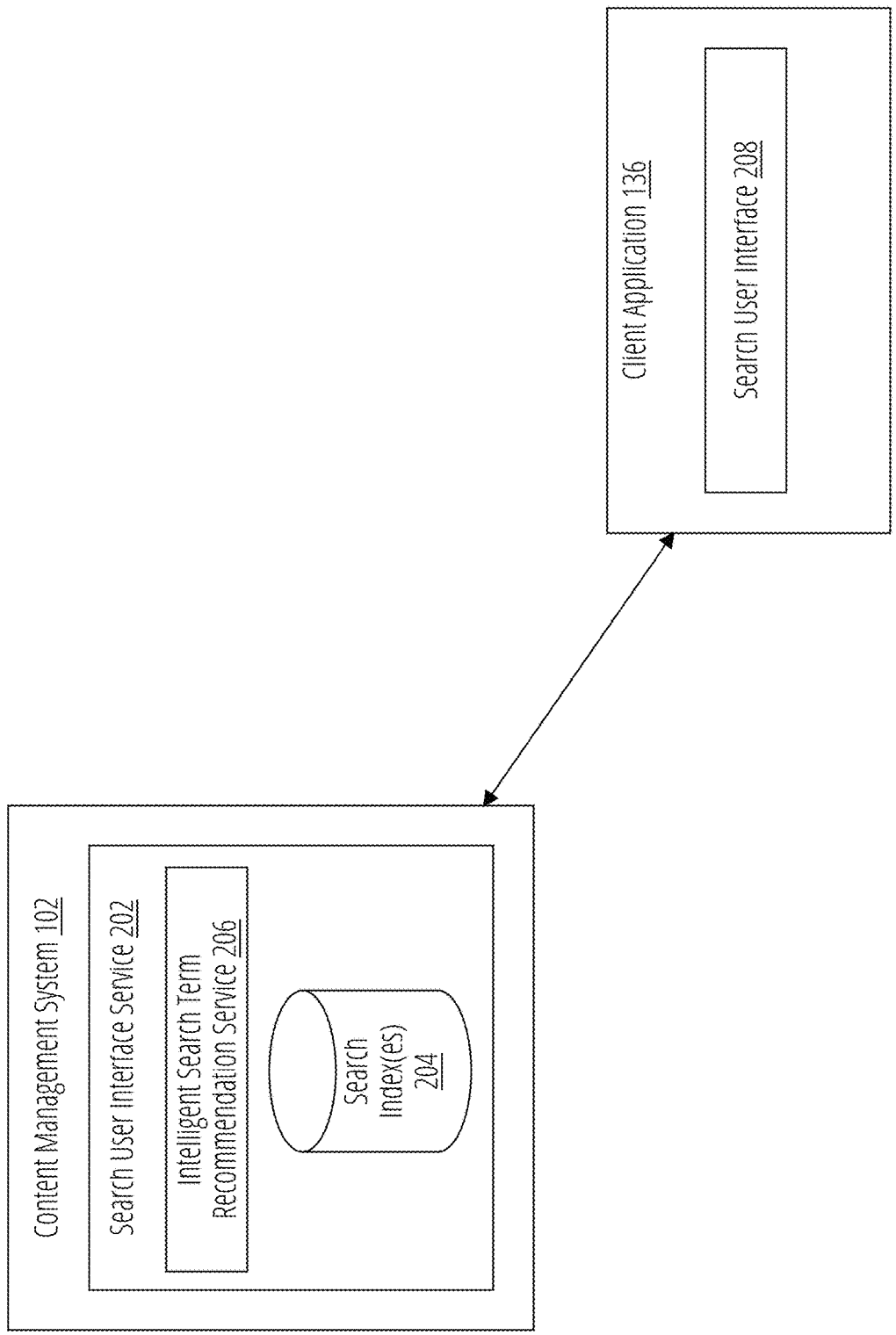
FIG. 2 illustrates additional details of the content management system and client application in accordance with some embodiments of the present technology.

FIG. 2 illustrates additional details of the content management system 102 and client application 136 in accordance with some embodiments of the present technology. More specifically, the content management system 102 includes search user interface service 202. The search user interface service 202 is configured to support a search user interface 208 as described herein. In some embodiments, the search user interface 208 is initially provided in an empty search state and pre-populated with suggested search terms in a plurality of contextual categories. As search inputs are provided into the search user interface, the suggested search terms within the contextual categories can be continuously refined to aid a user in finding the right object expediently.

The search user interface service 202 includes an intelligent search term recommendation service 206 configured to analyze data associated with a user account of content management system 102 to identify recommended search terms in the plurality of contextual categories. In some embodiments, the intelligent search term recommendation service 206 utilizes algorithms or heuristics to identify recommended search terms. In some embodiments, the intelligent search term recommendation service 206 can populate indexes, such as search index(es) 204, with recommended search terms prior to a search being performed.

In some embodiments, search user interface service 202 can query search index(es) 204 at the empty search state and repeatedly query search index(es) 204 while inputs are provided into the search user interface to provide refined suggested search terms.

The client application 136 can include a search user interface 208 for providing the search user interface to a user on a client device 132. As addressed with respect to FIG. 1, the client application 136 can be an application provided by the content management system 102 or a web page provided by the content management system 102.

While the system illustrated in FIG. 2 is presented with specific components, it should be understood by one skilled in the art that the configuration of the system is simply one possible configuration and that other configurations with more or fewer components are possible.

Figure 3:
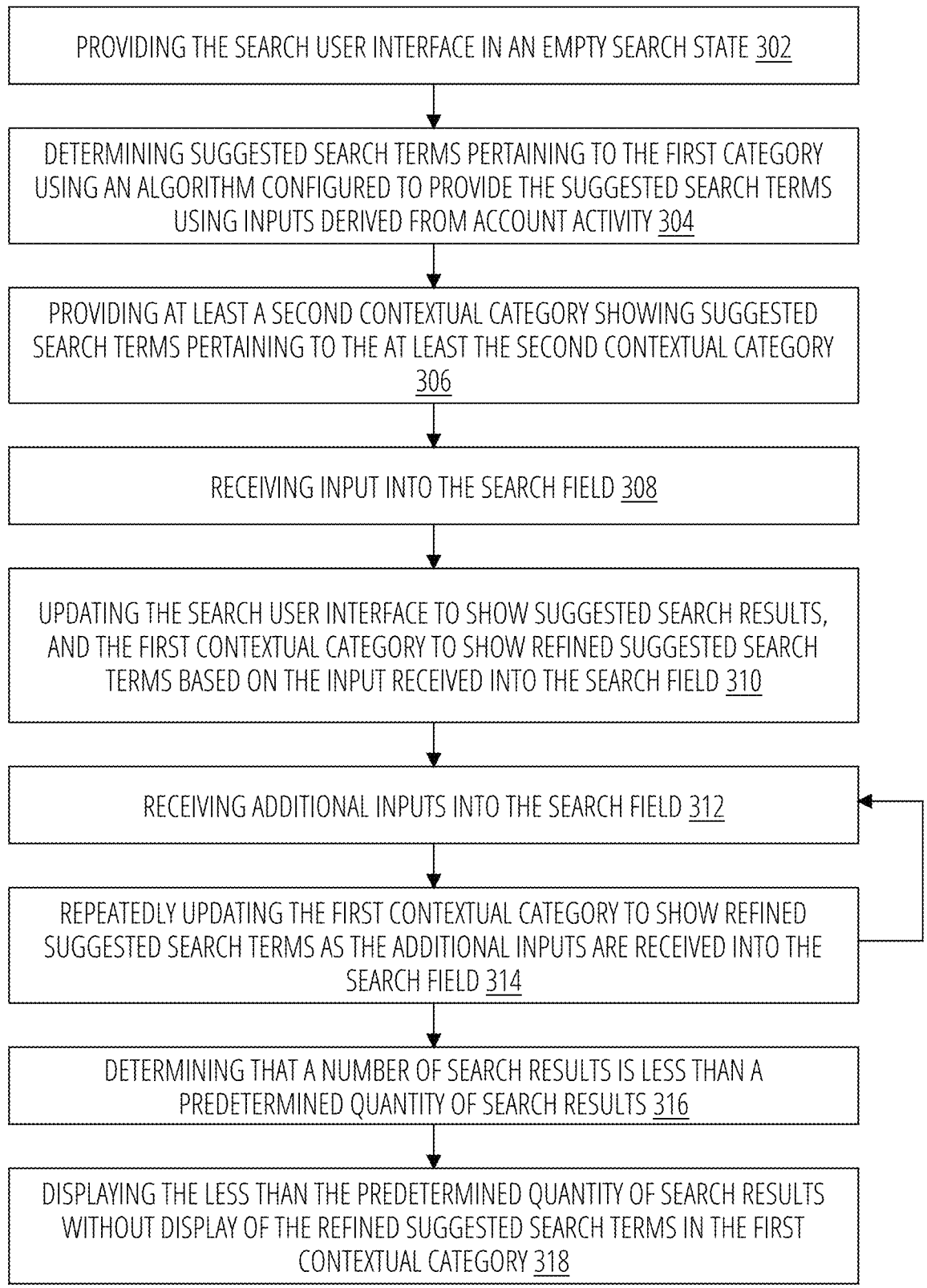
FIG. 3 illustrates an example method for providing an improved search user interface that begins with suggested search terms for a plurality of contextual categories in an empty search state and provides refined suggested search terms for the plurality of contextual categories as a user provides search inputs into the search user interface in accordance with some aspects of the present technology.

FIG. 3 illustrates an example method for providing an improved search user interface that begins with suggested search terms for a plurality of contextual categories in an empty search state and provides refined suggested search terms for the plurality of contextual categories as a user provides search inputs into the search user interface in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes providing the search user interface in an empty search state at block 302. For example, the search user interface service 202 illustrated in FIG. 2 may provide the search user interface in an empty search state for presentation by the search user interface 208. An empty search state is a state before an input is received into a search field of the search user interface.

Figure 4:
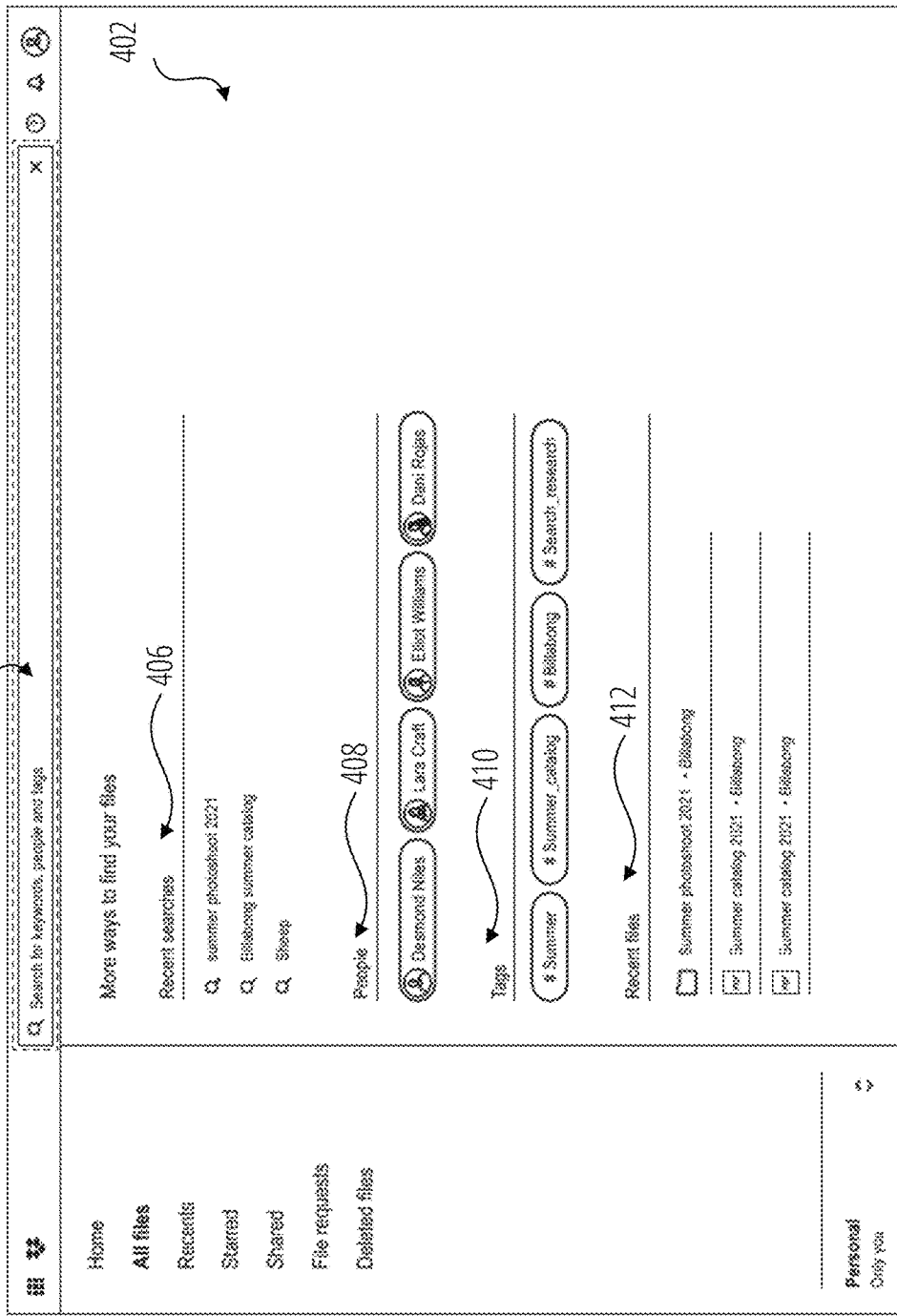
FIG. 4 illustrates an example search user interface in accordance with some aspects of the present technology.

The search user interface can include a plurality of contextual categories. An example search user interface 402 is shown in FIG. 4. The search user interface 402 is shown in an empty search state (where search field 404 has not yet been provided with a search input) with suggested search terms in a plurality of contextual categories. For example, the search user interface 402 has contextual categories recent searches category 406, people category 408, tags category 410, and recent files category 412.

These suggested search terms in the contextual categories can be helpful to a user wishing to carry out a search to choose search terms. In some instances, a user might be thinking of an object in the context of the people they collaborated with or the topic of a document, although they might not remember the specific terms in the document or object name. The suggested search terms might remind a user of some aspect of the document or make it easier and quicker to search. Another aspect of providing the contextual categories is that it can inform a user of possible categories which can be used to search for an object. A user may assume that only titles or strings appearing in a document can be used to locate an object in a search, but the presence of the contextual categories can inform a user that they can also search for objects using other contextual categories such as people and tags, etc.

In some embodiments, the contextual categories are populated from an index, such as search index(es) 204. The search index(es) 204 can be populated from analyzing activity and objects associated with a user account. In some embodiments, a machine learning algorithm provides initial data to populate the suggested search terms pertaining to the respective contextual categories. The machine learning algorithm(s) can either directly provide the suggested search terms or can be used to populate the search index(es) 204.

According to some examples, the method includes determining suggested search terms pertaining to a first category of the contextual categories using an algorithm configured to provide the suggested search terms using inputs derived from account activity at block 304. For example, the intelligent search term recommendation service 206 illustrated in FIG. 2 may determine suggested search terms pertaining to the first category using an algorithm configured to provide the suggested search terms using inputs derived from account activity.

The intelligent search term recommendation service 206 can also determine suggested search terms for other contextual categories, such as a second contextual category at block 306. For example, the intelligent search term recommendation service 206 illustrated in FIG. 2 may provide at least a second contextual category showing suggested search terms pertaining to the at least the second contextual category.

The first contextual category or the at least the second contextual category is one of a recent searches contextual category, a tags contextual category, a people contextual category, a recent objects contextual category, etc. As addressed above, the contextual categories can be populated from a search of an index specific to a user account of data for the respective contextual category, or the respective contextual category can be populated by an output from a machine learning algorithm. When populated from an index, a tags category is populated with tags occurring with the highest frequency associated with objects that are potential search results in the index. When populated from search index(es) 204, the people category can be populated with people having access to the same objects as the user account or a broader set of people such as people in the same organization.

In some embodiments, a set number of the top suggested search terms can be provided for each contextual category. Whereas, in some embodiments, only suggested search terms that have a threshold score higher than a value can be provided for each contextual category.

According to some examples, the method includes receiving input into the search field at block 308. For example, the search user interface 208 illustrated in FIG. 2 may receive input into the search field and communicate the input to search user interface service 202. The user input could be a selection of one of the suggested search terms from one of the contextual categories or can be type input.

In some embodiments, when the input is typed, the search user interface 208 can be configured with type-ahead suggestions, whereby the search user interface 208 can provide suggestions to complete search terms based on characters that have been previously typed. The type-ahead suggestions are determined by an algorithm that uses a graph to identify likely search phrases based on the input received into the search field. The type-ahead suggestions are determined from the most likely suggested search terms from the first contextual category. The search field provides type-ahead suggestions for input into the search field.

According to some examples, the method includes updating the search user interface to show suggested search results and updating the contextual categories to show refined suggested search terms based on the input received into the search field at block 310. For example, the search user interface service 202 illustrated in FIG. 2 may update the search user interface to show suggested search results and update the contextual categories to show refined suggested search terms based on the input received into the search field.

The updating of the contextual categories of the search interface can be especially helpful. Unlike other search interfaces that, once search terms are provided into a search field, remove further helpful hints in constructing the search, the present technology can continue to refine the suggested search terms within the contextual categories based on the search input. This refining of the suggested search terms can help users arrive at the right search result more quickly and with a higher rate of success than searches performed without the refining of the suggested search terms.

At any time the user can select an object as a search result, but until the search result is identified, the user can continue to provide inputs into the search field of the search user interface 208 which can forward the inputs to the search user interface service 202. For example, the search user interface service 202 illustrated in FIG. 2 may receive additional inputs into the search field at block 312.

According to some examples, the method includes repeatedly updating at least one of the contextual categories to show refined suggested search terms as the additional inputs are received into the search field at block 314. For example, the search user interface service 202 illustrated in FIG. 2 may repeatedly update the contextual categories to show refined suggested search terms as the additional inputs are received into the search field.

According to some examples, the method includes determining that a number of search results is less than a predetermined quantity of search results at block 316. For example, the search user interface service 202 illustrated in FIG. 2 may determine that a number of search results is less than a predetermined quantity of search results. As a result of determining that less than the predetermined quantity of search results are returned for the search query, the method includes displaying the search results without display of the refined suggested search terms in the contextual categories at block 318. For example, the 202 illustrated in FIG. 2 may display the search results without display of the refined suggested search terms.

FIG. 4 illustrates an example search user interface in accordance with some aspects of the present technology. The search user interface 402 is shown in an empty search state (where search field 404 has not yet been provided with a search input) with suggested search terms in a plurality of contextual categories. For example, the search user interface 402 has contextual categories such as the recent searches category 406, people category 408, tags category 410, and recent files category 412.

Figure 5A:
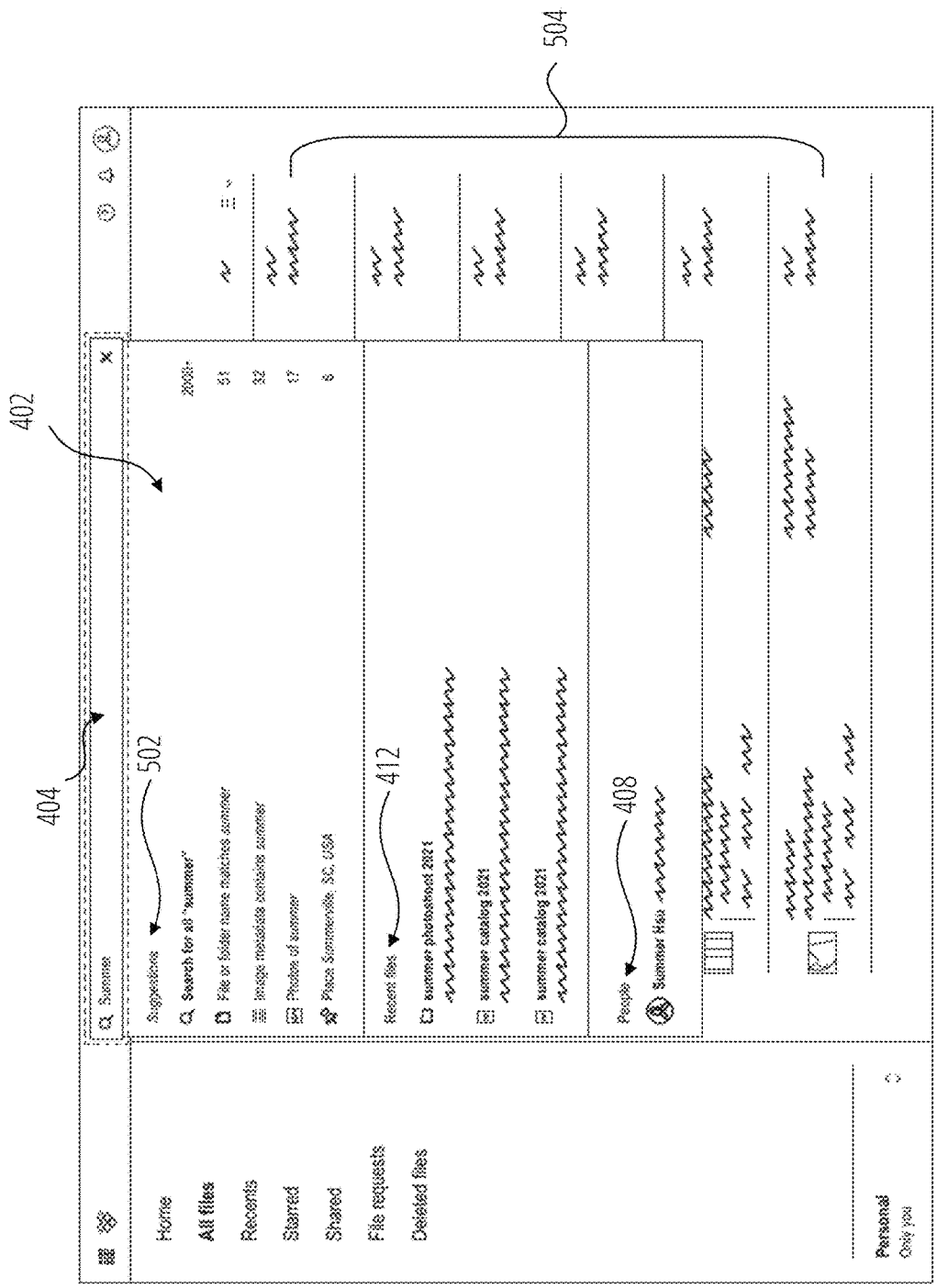
FIG. 5A and FIG. 5B illustrates an example search user interface as search terms are input into the search field of the search user interface in accordance with some aspects of the present technology.
Figure 5B:
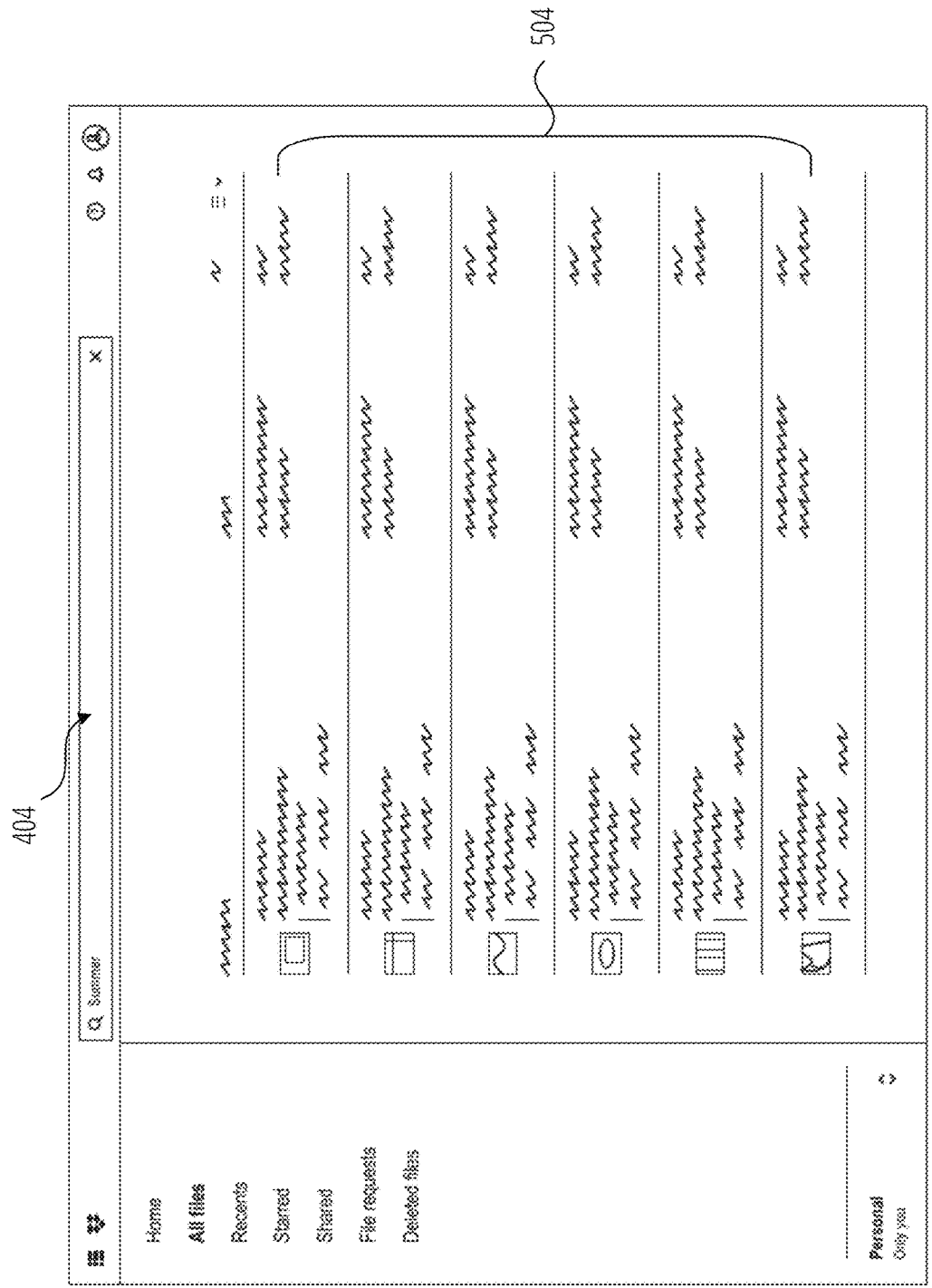

FIG. 5A and FIG. 5B illustrates an example search user interface as search terms are input into the search field of the search user interface in accordance with some aspects of the present technology. For example, the term "summer" has been provided as a search term. The term may have been typed or selected from the tags category 410 in FIG. 4.

As the search term is provided, the contextual categories can update to account for the input received in search field 404. As illustrated in FIG. 5A, contextual categories people category 408, and recent files category 412 have been updated with refined suggested search terms. The contextual category for tags, the tags category 410, is not shown because there are no more relevant suggested search terms in that contextual category. But, a new contextual category, the suggested search terms 502, has replaced the recent searches category 406. Accordingly, contextual categories can not only have refined suggested search terms based on the search input but can be newly presented or removed from search user interface 402 depending on their relevance.

Search results 504 can begin to be populated. The user can view the search results by moving the focus of the user interface outside of the search field 404 or can cause the search user interface 402 to be presented again by returning the focus of the user interface to search field 404.

As the user continues to provide inputs into the search field 404, the number of results may reduce until only a few remain. Once the number of search results is less than a predetermined quantity of search results, or no additional refined suggested search terms are available, the search user interface 402 can be removed, leaving only the search results 504, as illustrated in FIG. 5B.

FIG. 6 illustrates an example method for utilizing a machine learning algorithm or heuristic to provide suggested search terms in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes utilizing a machine learning algorithm or heuristic to analyze objects in a user account to provide suggested search terms at block 602. For example, the intelligent search term recommendation service 206 illustrated in FIG. 2 may utilize a machine learning algorithm or heuristic to analyze objects in a user account to provide suggested search terms in the empty search state, as described above.

According to some examples, the method includes building an index of suggested search terms at block 604. For example, the intelligent search term recommendation service 206 illustrated in FIG. 2 may build an index of suggested search terms.

An example heuristic for identifying recent objects can be based on a combination of frequently accessed objects and recently accessed objects. While the term "recent objects" suggests recency of object access is the only important factor, users tend to expect to see a list of the objects they are most likely to want to access, and this is thought to include both frequently accessed objects within a period and recently accessed objects. Accordingly, an example heuristic can count accesses of objects accessed over the last month, weight objects accessed most often highly, and weight objects accessed most recently highly too. In some embodiments, it can be necessary first to filter out objects that have been accessed by programs such as virus scanners but not the user from being considered in this heuristic.

An example heuristic for identifying important people can be based on how recently a user associated with the user account performing the search interacted with an object shared with respective candidate users to be selected as one of the suggested search terms.

An example of a machine learning algorithm is one that can analyze objects in a user account to generate tags to be associated with respective objects. In this example, machine learning has a benefit that it may identify tags that are more contextual and personal than manually defined tags. The tags associated with objects can be stored in an index, such as search index(es) 204, relating the tags with the respective object.

An example machine learning algorithm for identifying recent objects can be trained to receive signals regarding objects and predict how likely an object is to be clicked. Once again, while the term "recent objects" suggests recency of object access is the only important factor, users tend to expect to see a list of the objects they are most likely to want to access.

The index of suggested search terms can be used to determine, provide, and/or refine suggested search terms for presentation in a category within the search interface in the empty search state and after search inputs have been received in the search field. For example, the index of suggested search terms can be used during the steps described as block 304, 306, 310, and/or 314 of FIG. 3.

Figure 7:
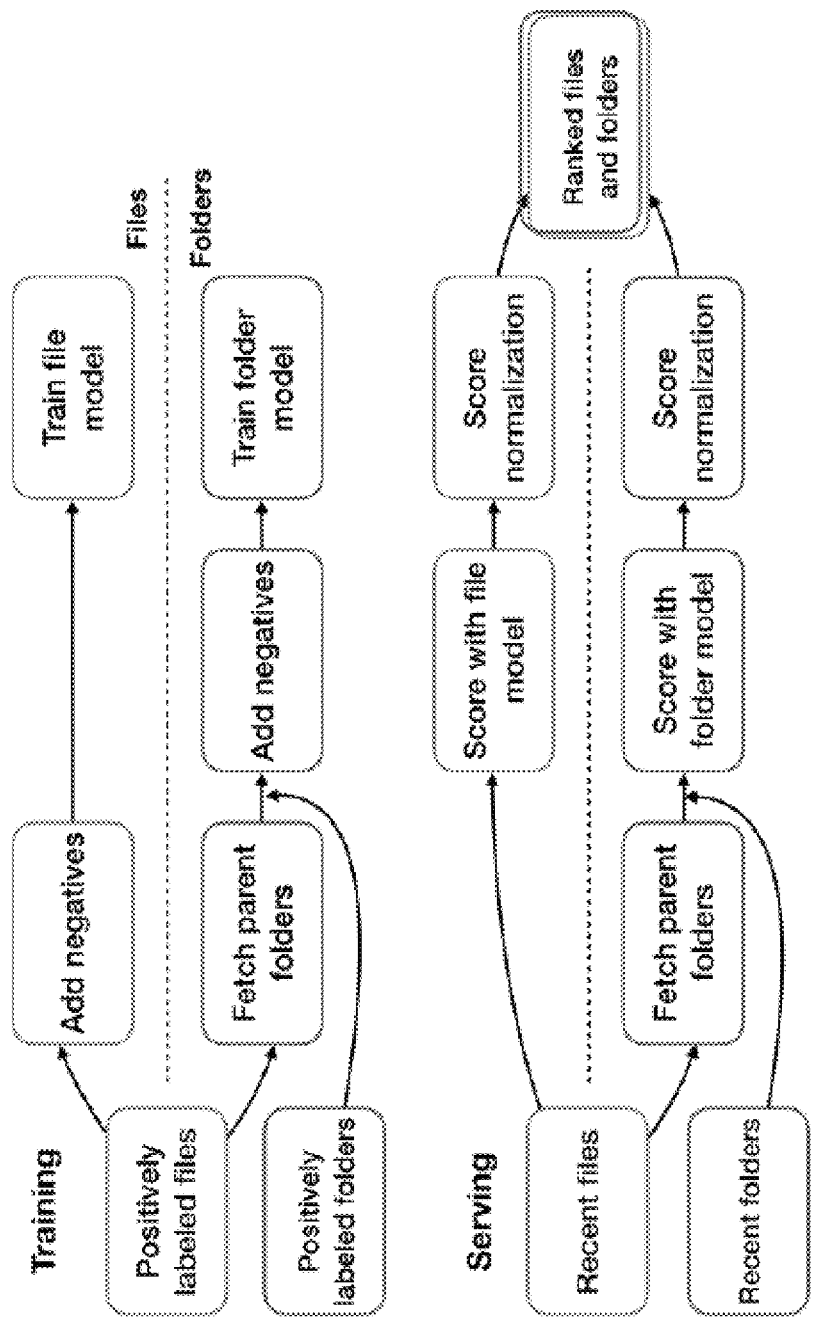
FIG. 7 illustrates an example machine learning pipeline for training and using the machine learning model to predict objects that are likely to be clicked in accordance with some aspects of the present technology.

FIG. 7 illustrates an example machine learning pipeline for training and using the machine learning model to predict objects that are likely to be clicked in accordance with some aspects of the present technology.

In this example, the machine learning model is trained using labeled training data. Objects such objects (files, folders, etc.) that have been selected in historical data are positively labeled objects, and objects that have been presented to a user but not selected are negatively labeled objects. In the case of folders, a user may have navigated a tree of folders before selecting the positively labeled folder, so, in some embodiments, parent folders can also be considered negatively labeled folders.

In some embodiments, the historical data can come from data relating to past searches for objects in a user account without any heuristics to suggest search terms, or the historical data can come from data relating to past searches where heuristics provides suggested search terms. In some embodiments, the historical data can come from both sources—searches with and without suggested search terms.

In some embodiments, since there will be so many files with negative labels (most objects in the search results are not selected), these samples could skew the machine learning algorithm away from identifying positively labeled files. To adjust for this uneven portion of data between positively labeled and negatively labeled objects, the negatively labeled objects can be sampled to reduce the total number of negatively labeled objects in the training set.

In addition to the labeled candidate objects, the training of the machine learning algorithm requires information about the objects. Accordingly, the training of the machine learning algorithm includes fetching signals pertaining to the objects. The signals include information such as a history of opens, edits, shares, etc., which users have worked on the object, object type, object size, etc. Other features can also include the user's current context (e.g., time of day and device type the user is using, etc.). The signals can also include content-based signals such as object names, tags, representations derived from natural language processing of the content of the object, etc. The signals can also provide information about a user account, such as a representation derived from locating a user account into a similarity embedding space to cluster similar user accounts.

Collectively, these features can be used to create a feature vector to represent each object to be classified by the machine learning algorithm.

In order to provide sufficient speed, each object to be classified by the machine learning algorithm can be analyzed independently and in parallel to the analysis of other objects.

Then the machine learning algorithm can score each object. When the machine learning model is training, a loss function or other feedback mechanism can be used to reinforce the model with information regarding correct and incorrect classifications. When the machine learning model is used to output "recent objects," the objects can be ranked based on their respective scores.

In some embodiments, the machine-learned model can be configured to output a probability that a particular object is likely to be clicked on by a user. In some embodiments, the machine-learned model can be configured to provide a binary prediction of objects that are likely to be selected and not selected.

In some embodiments, data conditioning can be performed prior to training to improve the training dataset. For example, objects that were opened quickly, scrolled, and then closed could be removed from the training set as neither being representative of a positively selected object nor a negatively selected object. This might happen when a user opens a folder and quickly browses the file names of objects within the folder without selecting one. This would suggest that the folder was not a good selection, but neither was it not selected, so the value of this data might not be clear enough for use in training.

An example heuristic for identifying important people can be trained using data that identifies important people from a combination workplace collaborators (two users that may not share any objects between them but are on a same or similar team) and content actors (users that have objects shared between them). A machine learning algorithm can be trained to identify when it is best to surface a collaborator or content actor. The machine-learning algorithm can most strongly recommend people that are both collaborators and content actors but provide lower weights for people that only belong to one of the collaborator or content actor categories.

Figure 8:
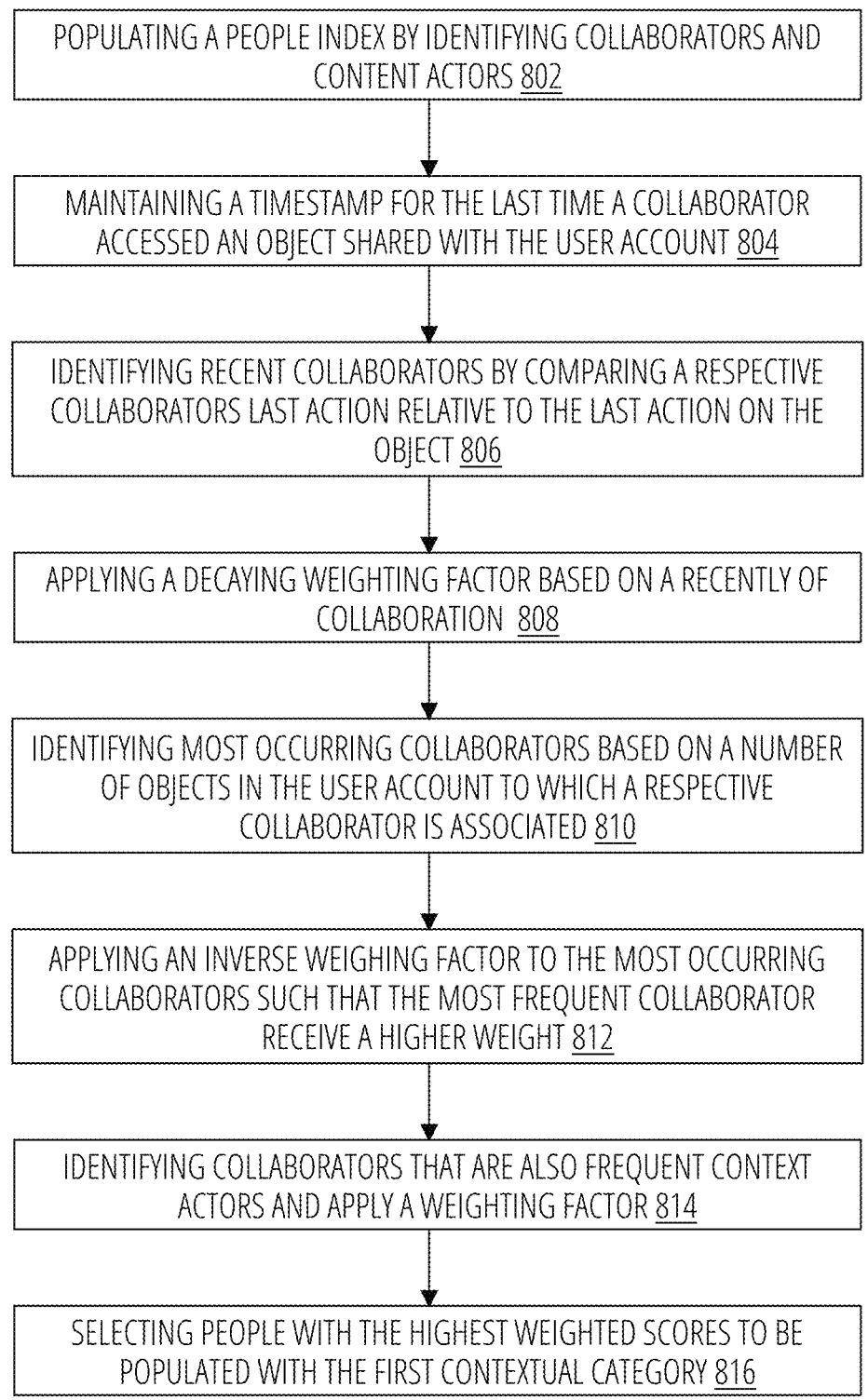
FIG. 8 illustrates an example method for identifying people to be recommended in the people contextual category in accordance with some aspects of the present technology.

FIG. 8 illustrates an example method for identifying people to be recommended in the people contextual category in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes populating a people index by identifying collaborators and content actors at block 802. For example, the intelligent search term recommendation service 206 illustrated in FIG. 2 may populate a people index by identifying collaborators and content actors. Collaborators are people that share access to an object to which the user account has access. Content actors are people that frequently access objects in a shared directory to which the user account has access but are not interacting with the same objects as the user account.

The people contextual category is populated with people that are collaborators and context actors associated with objects that are potential search results in the index having the highest weighted score.

According to some examples, the method includes maintaining a timestamp for the last time a collaborator accessed an object shared with the user account at block 804. For example, the intelligent search term recommendation service 206 illustrated in FIG. 2 may maintain a timestamp for the last time a collaborator accessed an object shared with the user account.

According to some examples, the method includes identifying recent collaborators by comparing a respective collaborator's last action relative to the last action on the object at block 806. For example, the intelligent search term recommendation service 206 illustrated in FIG. 2 may identify recent collaborators by comparing a respective collaborator's last action relative to the last action on the object.

According to some examples, the method includes applying a decaying weighting factor based on a recency of collaboration at block 808. For example, the intelligent search term recommendation service 206 illustrated in FIG. 2 may apply a decaying weighting factor based on a recency of collaboration between two users. More recent collaborations receive a higher weight.

According to some examples, the method includes identifying most occurring collaborators based on a number of objects in the user account to which a respective collaborator is associated at block 810. For example, the intelligent search term recommendation service 206 illustrated in FIG. 2 may identify the most occurring collaborators based on a number of objects in the user account to which a respective collaborator is associated.

According to some examples, the method includes applying an inverse weighting factor to the most occurring collaborators such that the most frequent collaborator receives a higher weight at block 812. For example, the intelligent search term recommendation service 206 illustrated in FIG. 2 may apply an inverse weighting factor to the most occurring collaborators such that the most frequent collaborator receives a higher weight.

According to some examples, the method includes identifying collaborators that are also frequent context actors and applying a weighting factor at block 814. For example, the intelligent search term recommendation service 206 illustrated in FIG. 2 may identify collaborators that are also frequent context actors and apply a weighting factor.

According to some examples, the method includes selecting people with the highest weighted scores to be populated into a search index which can be used to provide recommended people for the people contextual category at block 816. For example, the intelligent search term recommendation service 206 illustrated in FIG. 2 may select people with the highest weighted scores.

The people with the highest weighted scores can be used to determine, provide, and/or refine suggested search terms for presentation in a category within the search interface in the empty search state and after search inputs have been received in the search field. For example, the people with the highest weighted scores can be used during the steps described as block 304, 306, 310, and/or 314 of FIG. 3.

Figure 9A:
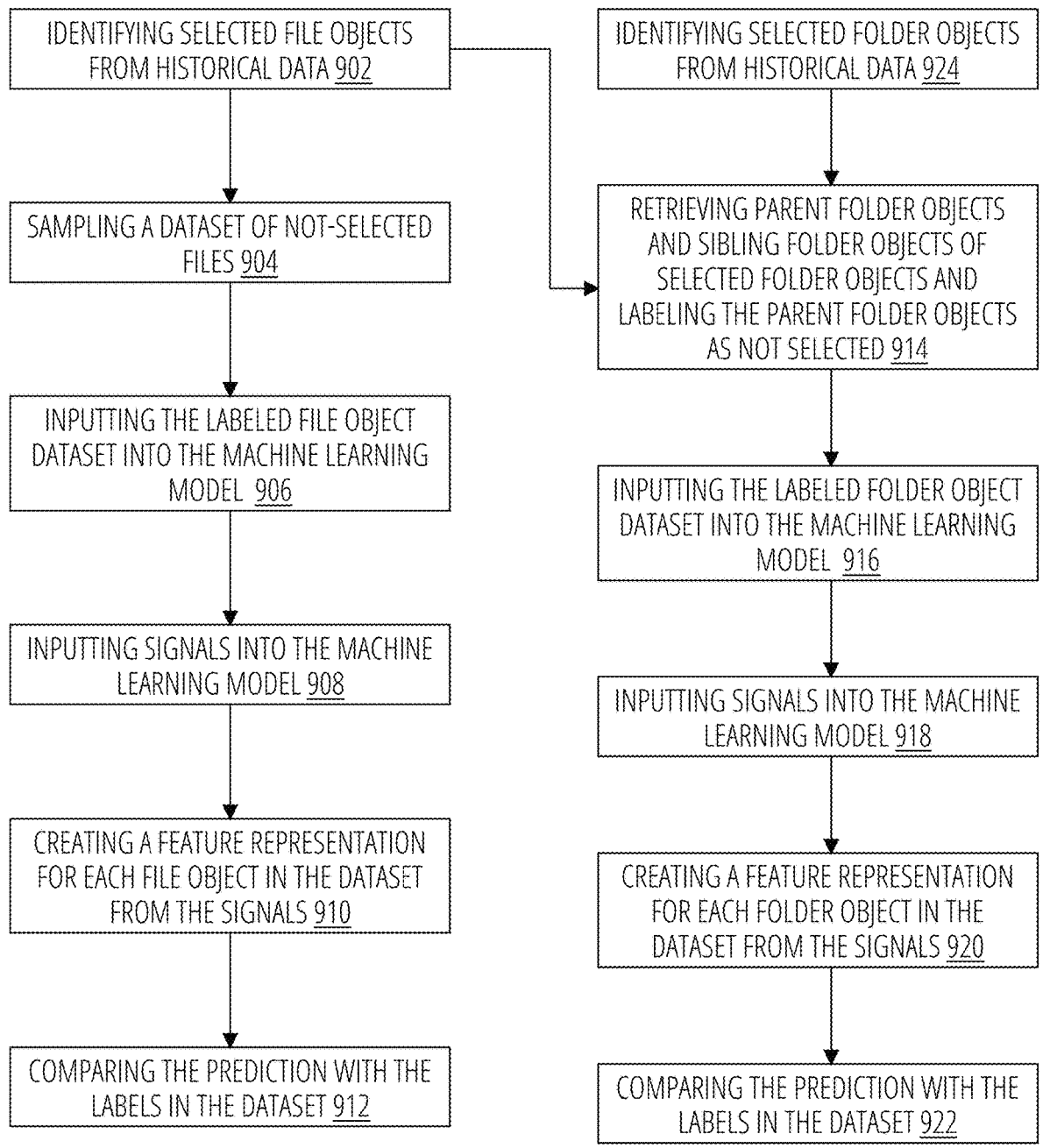
FIG. 9A illustrates an aspect of the subject matter in accordance with one embodiment.

FIG. 9A illustrates a method for training a machine learning model to predict objects that are likely to be clicked in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the intelligent search term recommendation service 206 can be trained to predict whether a file object or folder object will be selected when recommended to a user. The prediction algorithms can be different for each type of object (i.e., folders, files, etc.).

According to some examples, the method includes identifying selected file objects from historical data at block 902. For example, the intelligent search term recommendation service 206 illustrated in FIG. 2 may identify selected file objects from historical data.

According to some examples, the method includes sampling a dataset of not-selected files at block 904. For example, the intelligent search term recommendation service 206 illustrated in FIG. 2 may sample a dataset of not-selected files.

According to some examples, the method includes inputting the labeled file object dataset into the machine learning model at block 906. For example, the intelligent search term recommendation service 206 illustrated in FIG. 2 may input the labeled file object dataset into the machine learning model.

According to some examples, the method includes inputting signals into the machine learning model at block 908. For example, the intelligent search term recommendation service 206 illustrated in FIG. 2 may input signals into the machine learning model.

According to some examples, the method includes creating a feature representation for each file object in the dataset from the signals at block 910. For example, the intelligent search term recommendation service 206 illustrated in FIG. 2 may create a feature representation for each file object in the dataset from the signals.

According to some examples, the method includes comparing the prediction with the labels in the dataset at block 912. For example, the intelligent search term recommendation service 206 illustrated in FIG. 2 may compare the prediction with the labels in the dataset and use a successful prediction or a discrepancy in prediction as feedback to further train the machine learning model.

According to some examples, the method includes identifying selected folder objects from historical data at block 924. For example, the intelligent search term recommendation service 206 illustrated in FIG. 2 may identify selected folder objects from historical data.

According to some examples, the method includes retrieving parent folder objects and sibling folder objects of selected folder objects and labeling the parent folder objects as not selected at block 914. For example, the intelligent search term recommendation service 206 illustrated in FIG. 2 may retrieve parent folder objects and sibling folder objects of selected folder objects and label the parent folder objects as not selected. A sibling folder object can be other folder objects in the same directory as a selected folder object.

According to some examples, the method includes inputting the labeled folder object dataset into the machine learning model at block 916. For example, the intelligent search term recommendation service 206 illustrated in FIG. 2 may input the labeled folder object dataset into the machine learning model.

According to some examples, the method includes inputting signals into the machine learning model at block 918. For example, the intelligent search term recommendation service 206 illustrated in FIG. 2 may input signals into the machine learning model.

According to some examples, the method includes creating a feature representation for each folder object in the dataset from the signals at block 920. For example, the intelligent search term recommendation service 206 illustrated in FIG. 2 may create a feature representation for each folder object in the dataset from the signals.

According to some examples, the method includes comparing the prediction with the labels in the dataset at block 922. For example, the intelligent search term recommendation service 206 illustrated in FIG. 2 may compare the prediction with the labels in the dataset and use a successful prediction or a discrepancy in prediction as feedback to further train the machine learning model.

Figure 9B:
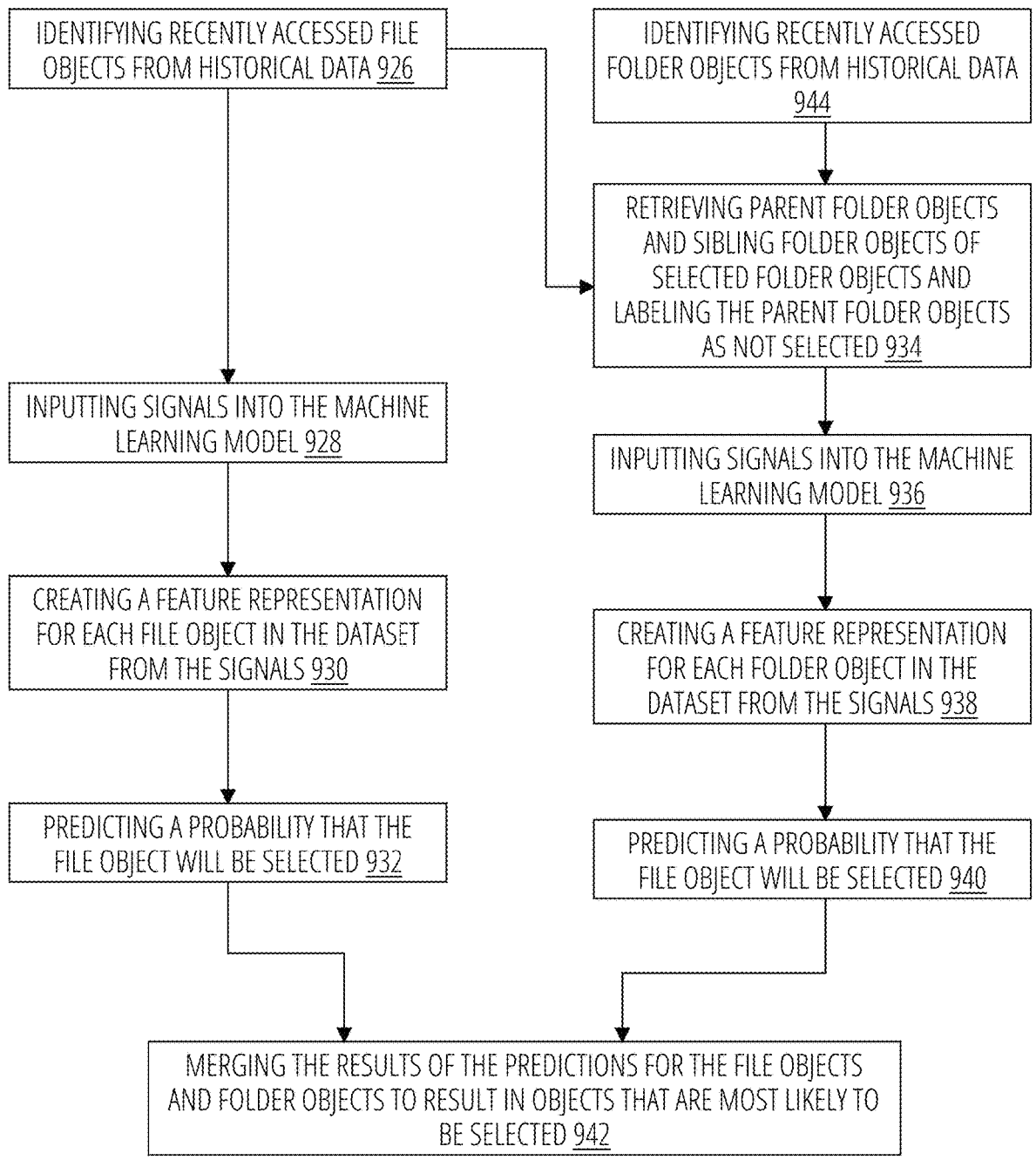
FIG. 9B illustrates an aspect of the subject matter in accordance with one embodiment.

FIG. 9B illustrates a method for training a machine learning model to predict objects that are likely to be clicked in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, once trained, the intelligent search term recommendation service 206 can be used to predict whether a file object or folder object will be selected when recommended to a user. The prediction algorithms can be different for each type of object (i.e., folders, files, etc.).

According to some examples, the method includes identifying recently accessed file objects from historical data at block 926. For example, the intelligent search term recommendation service 206 illustrated in FIG. 2 may identify recently accessed file objects from historical data.

According to some examples, the method includes inputting signals into the machine learning model at block 928. For example, the intelligent search term recommendation service 206 illustrated in FIG. 2 may input signals into the machine learning model.

According to some examples, the method includes creating a feature representation for each file object in the dataset from the signals at block 930. For example, the intelligent search term recommendation service 206 illustrated in FIG. 2 may create a feature representation for each file object in the dataset from the signals.

According to some examples, the method includes predicting a probability that the file object will be selected in the dataset at block 932. For example, the intelligent search term recommendation service 206 illustrated in FIG. 2 may predict the probability that the file object will be selected.

According to some examples, the method includes identifying recently accessed folder objects from historical data at block 944. For example, the intelligent search term recommendation service 206 illustrated in FIG. 2 may identify recently accessed folder objects from historical data.

According to some examples, the method includes retrieving parent folder objects and sibling folder objects of selected folder objects and labeling the parent folder objects as not selected at block 934. For example, the intelligent search term recommendation service 206 illustrated in FIG. 2 may retrieve parent folder objects and sibling folder objects of selected folder objects and label the parent folder objects as not selected.

According to some examples, the method includes inputting signals into the machine learning model at block 936. For example, the intelligent search term recommendation service 206 illustrated in FIG. 2 may input signals into the machine learning model.

According to some examples, the method includes creating a feature representation for each folder object in the dataset from the signals at block 938. For example, the intelligent search term recommendation service 206 illustrated in FIG. 2 may create a feature representation for each folder object in the dataset from the signals.

According to some examples, the method includes predicting a probability that the file object will be selected at block 940. For example, the intelligent search term recommendation service 206 illustrated in FIG. 2 may predict the probability that the file object will be selected.

According to some examples, the method includes merging the results of the predictions for the file objects and folder objects to result in objects that are most likely to be selected at block 942. For example, the intelligent search term recommendation service 206 illustrated in FIG. 2 may merge the results of the predictions for the file objects and folder objects to result in objects that are most likely to be selected.

The objects that are most likely to be selected can be used to determine, provide, and/or refine suggested search terms for presentation in a category within the search interface in the empty search state and after search inputs have been received in the search field. For example, the objects that are most likely to be selected can be used during the steps described as block 304, 306, 310, and/or 314 of FIG. 3.

Figure 10:
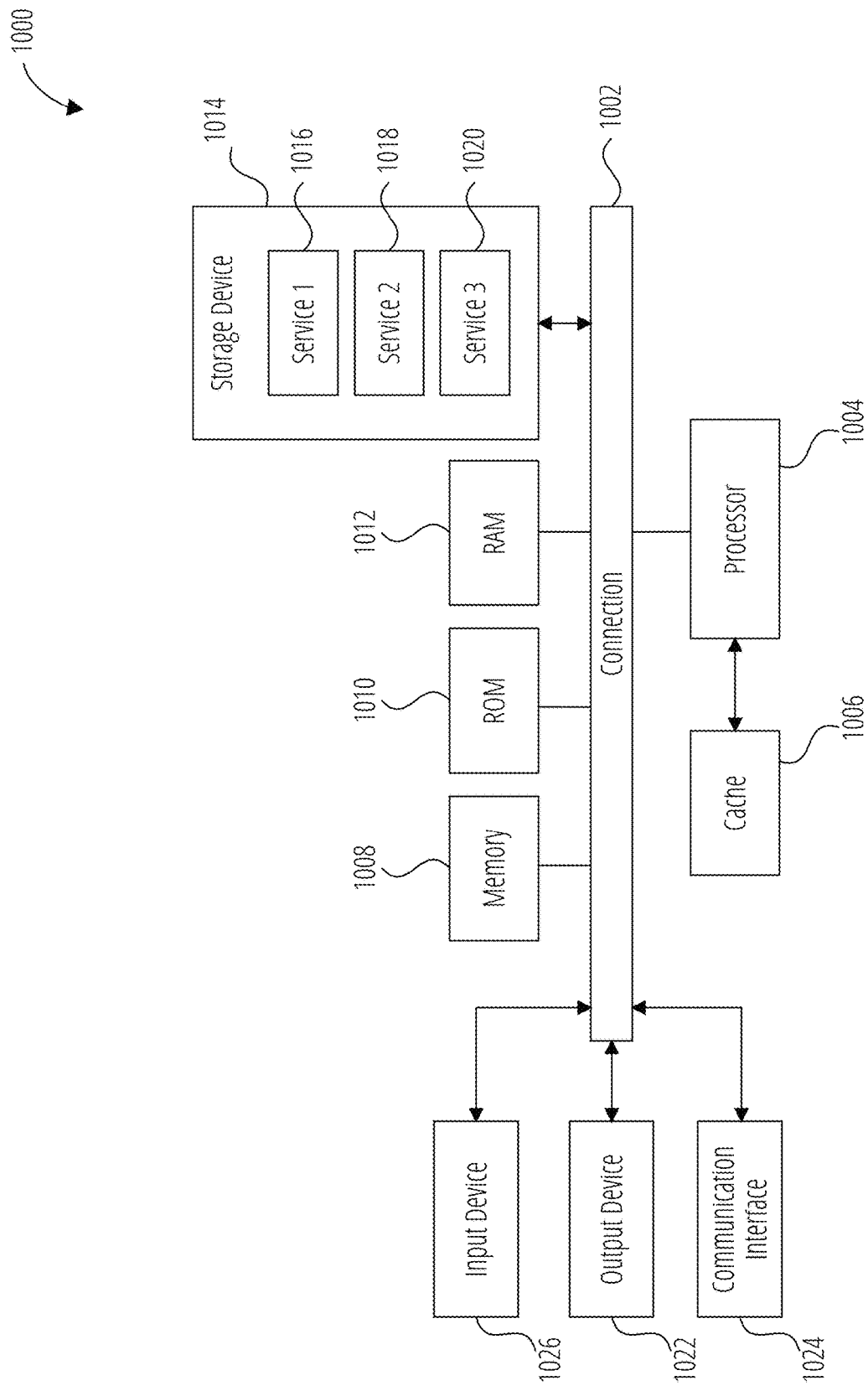
FIG. 10 shows an example of a system for implementing certain aspects of the present technology.

FIG. 10 shows an example of computing system 1000, which can be for example any computing device making up search user interface service 202 or content management system 102 or client devices 132, or any component thereof in which the components of the system are in communication with each other using connection 1002. Connection 1002 can be a physical connection via a bus, or a direct connection into processor 1004, such as in a chipset architecture. Connection 1002 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Computing system 1000 can include a cache of high-speed memory 1006 connected directly with, in close proximity to, or integrated as part of processor 1004.

Processor 1004 can include any general purpose processor and a hardware service or software service, such as services 1016, 1018, and 1020 stored in storage device 1014, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

Storage device 1014 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1014 can include software services, servers, services, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method for providing a search user interface including at least two dynamic contextual categories, the method comprising: providing the search user interface in an empty search state, wherein the empty search state is a state before an input is received into a search field, the search user interface in the empty search state includes the search field, a first contextual category showing suggested search terms pertaining to the first contextual category, receiving input into the search field; updating the search user interface to show suggested search results, and the first contextual category to show refined suggested search terms based on the input received into the search field.

Aspect 2. The method of Aspect 1, further comprising: determining suggested search terms pertaining to the first category using an algorithm configured to provide the suggested search terms using inputs derived from account activity.

Aspect 3. The method of any of Aspects 1 to 2, further comprising: determining the refined suggested search terms using the using an algorithm configured to provide the suggested search terms using inputs derived from account activity and the input into the search field.

Aspect 4. The method of any of Aspects 1 to 3, further comprising: after the updating the search user interface to show suggested search results and the refined suggested search terms in the first contextual category, determining that a number of search results is less than a predetermined quantity of search results; displaying the less than the predetermined quantity of search results without display of the refined suggested search terms in the first contextual category.

Aspect 5. The method of any of Aspects 1 to 4, further comprising: receiving additional inputs into the search field; repeatedly updating the first contextual category to show refined suggested search terms as the additional inputs are received into the search field.

Aspect 6. The method of any of Aspects 1 to 5, further comprising: providing at least a second contextual category showing suggested search terms pertaining to the at least the second contextual category.

Aspect 7. The method of any of Aspects 1 to 6, wherein the first contextual category or the at least the second contextual category are one of a recent searches contextual category, a tags contextual category, a people contextual category, or a recent objects contextual category.

Aspect 8. The method of any of Aspects 1 to 7, wherein the search field provides type ahead suggestions for input into the search field.

Aspect 9. The method of any of Aspects 1 to 8, wherein the type ahead suggestions are determined by an algorithm that uses a graph to identify likely search phrases based on the input received into the search field.

Aspect 10. The method of any of Aspects 1 to 9, wherein the type ahead suggestions are determined from most likely suggested search terms from the first contextual category.

Aspect 11. The method of any of Aspects 1 to 10, wherein the first contextual category showing suggested search terms pertaining to the first contextual category is populated from a search of an index specific a user account of data for the first contextual category.

Aspect 12. The method of any of Aspects 1 to 11, wherein the index is populated with data from a machine learning algorithm.

Aspect 13. The method of any of Aspects 1 to 12, wherein the first contextual category is a tags category, the method further comprising: in an offline process, utilizing a machine learning algorithm to analyze objects in a user account to provide tags to be associated with respective objects, wherein machine learning has a benefit that it may identify tags that are more contextual and personal than manually defined tags; building an index relating the tags with the respective object.

Aspect 14. The method of any of Aspects 1 to 13, wherein the index is also populated with tags that have been manually defined by a user associated with the user account.

Aspect 15. The method of any of Aspects 1 to 14, the first contextual category is populated with tags occurring with a highest frequency associated with objects that are potential search results in the index.

Aspect 16. The method of any of Aspects 1 to 15, wherein the first contextual category is a people category, the method further comprising: populating a people index by identifying collaborators and content actors, wherein collaborators are people that share access to an object to which the user account has access, wherein content actors are people that frequently access objects in a shared directory to which the user account has access, but are not interacting with the same objects as the user account; maintaining a timestamp for the last time a collaborator accessed an object shared with the user account.

Aspect 17. The method of any of Aspects 1 to 16, wherein the first contextual category is populated with people that are collaborators and context actors associated with objects that are potential search results in the index having a highest weighted score, the method of determining the weighted score comprising: identify recent collaborators by comparing a respective collaborators last action relative to the last action on the object; apply a decaying weighting factor based on a recently of collaboration, wherein more recent collaborates receive a higher weight; identify most occurring collaborators based on a number of objects in the user account to which a respective collaborator is associated; apply an inverse weighing factor to the most occurring collaborators such that the most frequent collaborator receive a higher weight; identify collaborators that are also frequent context actors and apply a weighting factor; select people with the highest weighted scores to be populated with the first contextual category.

Aspect 18. The method of any of Aspects 1 to 17, wherein the first contextual category showing suggested search terms pertaining to the first contextual category is populated by an output from a machine learning algorithm.

Aspect 19. The method of any of Aspects 1 to 18, wherein the machine learning algorithm provides initial data to populate the suggested search terms pertaining to the first contextual category, and after input is received into the search field, suggested search terms pertaining to the first contextual category are populated from a search of an index specific a user account of data for the first contextual category.

What is claimed is:

1. A method for providing a search user interface including at least two dynamic contextual categories, the method comprising:
providing the search user interface for searching a content management system in an empty search state, wherein the empty search state is a state before an input is received into a search field, the search user interface in the empty search state includes the search field, at least one contextual category including a first contextual category showing suggested search terms pertaining to the first contextual category and a second contextual category showing suggested search terms pertaining to the second contextual category, wherein the first contextual category or the second contextual category is a recent searches contextual category, a tags contextual category, a people contextual category, or a recent objects contextual category;
receiving a first input into the search field and a subsequent input into the search field, wherein the suggested search terms within the first contextual category and the second contextual category are repeatedly refined as further subsequent inputs are received into the search user interface;
repeatedly updating the first contextual category and the second contextual category, respectively, as additional inputs are received into the search field; and
updating the search user interface to show suggested search results.

2. The method of claim 1, further comprising:
determining the suggested search terms pertaining to the first contextual category using an algorithm configured to provide the suggested search terms derived from account activity.

3. The method of claim 1, further comprising:
determining the refined suggested search terms using an algorithm configured to provide the suggested search terms using inputs derived from account activity and the input into the search field.

4. The method of claim 1, further comprising:
after the updating the search user interface to show suggested search results and the refined suggested search terms in the first contextual category, determining that a number of search results is less than a predetermined quantity of search results; and
removing the search user interface to display the less than the predetermined quantity of search results.

5. The method of claim 1, further comprising:
receiving additional inputs into the search field.

6. The method of claim 1, wherein the first contextual category showing suggested search terms pertaining to the first contextual category is populated from a search of an index specific to a user account for the first contextual category.

7. A non-transitory computer-readable storage medium, the computer-readable storage medium including instructions that when executed by at least one processor, cause the at least one processor to:
provide a search user interface for searching a content management system in an empty search state, wherein the empty search state is a state before an input is received into a search field, the search user interface in the empty search state includes the search field, at least one contextual category including a first contextual category showing suggested search terms pertaining to the first contextual category and a second contextual category showing suggested search terms pertaining to the second contextual category, wherein the first contextual category or the second contextual category is a recent searches contextual category, a tags contextual category, a people contextual category, or a recent objects contextual category;
receive a first input into the search field and a subsequent input into the search field, wherein the suggested search terms within the first contextual category and the second contextual category are repeatedly refined as further subsequent inputs are received into the search user interface;
repeatedly update the first contextual category and the second contextual category, respectively, as additional inputs are received into the search field; and
update the search user interface to show suggested search results.

8. The computer-readable storage medium of claim 7, wherein the instructions further configure the at least one processor to:
determine suggested search terms pertaining to the first contextual category using an algorithm configured to provide the suggested search terms derived from account activity.

9. The computer-readable storage medium of claim 8, wherein the instructions further configure the at least one processor to:
after the updating the search user interface to show suggested search results and the refined suggested search terms in the first contextual category, determine that a number of search results is less than a predetermined quantity of search results; and
remove the search user interface to display the less than the predetermined quantity of search results.

10. The computer-readable storage medium of claim 7, wherein the instructions further configure the at least one processor to:
determine the refined suggested search terms using an algorithm configured to provide the suggested search terms using inputs derived from account activity and the input into the search field.

11. The computer-readable storage medium of claim 7, wherein the instructions further configure the at least one processor to:
receive additional inputs into the search field.

12. A computing system comprising:
at least one processor; and
a memory storing instructions that, when executed by the at least one processor, configure the system to:
provide a search user interface for searching a content management system in an empty search state, wherein the empty search state is a state before an input is received into a search field, the search user interface in the empty search state includes the search field, at least one contextual category including a first contextual category showing suggested search terms pertaining to the first contextual category and a second contextual category showing suggested search terms pertaining to the second contextual category, wherein the first contextual category or the second contextual category is a recent searches contextual category, a tags contextual category, a people contextual category, or a recent objects contextual category;
receive a first input into the search field and a subsequent input into the search field, wherein the suggested search terms within the first contextual category and the second contextual category are repeatedly refined as further subsequent inputs are received into the search user interface;
repeatedly update the first contextual category and the second contextual category, respectively, as additional inputs are received into the search field; and
update the search user interface to show suggested search results.

13. The computing system of claim 12, wherein the instructions further configure the system to:
determine suggested search terms pertaining to the first contextual category using an algorithm configured to provide the suggested search terms derived from account activity.

14. The computing system of claim 13, wherein the instructions further configure the system to:
  determine the refined suggested search terms using an algorithm configured to provide the suggested search terms using inputs derived from account activity and the input into the search field.

15. The computing system of claim 13, wherein the instructions further configure the system to:
  after the updating the search user interface to show suggested search results and the refined suggested search terms in the first contextual category, determine that a number of search results is less than a predetermined quantity of search results; and
  remove the search user interface to display the less than the predetermined quantity of search results.

16. The computing system of claim 12, wherein the instructions further configure the system to:
  receive additional inputs into the search field.

\* \* \* \* \*